US008992883B2

(12) United States Patent
Panigrahy et al.

(10) Patent No.: US 8,992,883 B2
(45) Date of Patent: Mar. 31, 2015

(54) POLYMER-MEDIATED SYNTHESIS OF ZNO NANOSTRUCTURES

(75) Inventors: Bharati Panigrahy, Mumbai (IN); Mohammed Aslam, Mumbai (IN); Devi Shanker Misra, Mumbai (IN); Dhirendra Bahadur, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 190 days.

(21) Appl. No.: 12/794,272

(22) Filed: Jun. 4, 2010

(65) Prior Publication Data
US 2011/0300061 A1 Dec. 8, 2011

(51) Int. Cl.
*C01G 9/02* (2006.01)
*B82Y 30/00* (2011.01)

(52) U.S. Cl.
CPC . *C01G 9/02* (2013.01); *B82Y 30/00* (2013.01); *C01P 2004/13* (2013.01); *C01P 2004/10* (2013.01); *C01P 2004/16* (2013.01); *C01P 2004/54* (2013.01); *C01P 2004/61* (2013.01); *Y10S 977/762* (2013.01)
USPC .......................................... 423/622; 977/762

(58) Field of Classification Search
CPC ............. C01P 2004/64; C01P 2004/16; C01P 2004/13; C01G 9/02; C01G 9/03
USPC ............. 423/1, 99, 109, 592.1, 622; 977/762, 977/763, 773, 775, 777, 810, 811
See application file for complete search history.

(56) References Cited

PUBLICATIONS

Yang, H. et al, "Density-controlled growth of ZnO nanorods using ZnO nanocrystals-embedded polymer composite" Available online Aug. 3, 2008, Current Applied Physics 9 (2009), 797-801.*
Pauporte, Thierry, "Design of Solution-Grown ZnO Nanostructures", Jun. 1, 2009, Springer, pp. 77-119.*
Duan et al, "PEG-Assisted Synthesis of ZnO Nanotubes", Jan. 5, 2006, Materials Letters 60, 1918-1921.*
Govender et al, "Understanding the Factors that Govern the Deposition and Morphology of Thin Films of ZnO from Aqueous Solution", Jun. 15, 2004, Journal of Materials Chemistry, pp. 2575-2591.*
Huo et al, "Direct and Large-Area Growth of 1-D ZnO Nanostructures from and on a Brass Substrate", 2007, J. Phys. Chem, 111, pp. 5876-5881.*
Panigrahy et al, "Polymer-mediated Shape-selective synthesis of ZnO nanostructures using a single-step aqueous approach", Jun. 12, 2009, CrystEngComm, 11, pp. 1920-1925.*
Yiamsawas et al, "Preparation of ZnO Nanostructures by Solvothermal Method", Feb. 2009, Journal of Microscopy Society of Thailand, vol. 23 (1), pp. 75-78.*
Vayssieres, Lionel, "Growth of Arrayed Nanorods and Nanowires of ZnO from Aqueous Solutions," 2003, Advanced Materials vol. 15, No. 5., pp. 464-466.*

(Continued)

*Primary Examiner* — Anthony J Zimmer
*Assistant Examiner* — Justin Bova
(74) *Attorney, Agent, or Firm* — Moritt Hock & Hamroff LLP; Steven S. Rubin, Esq.

(57) ABSTRACT

Disclosed are methods for producing ZnO nanostructures, the methods comprising heating an aqueous solution comprising a zinc compound, a base, and a polymer which is polyvinylpyrrolidinone or poly(ethylene glycol).

13 Claims, 5 Drawing Sheets

(56) References Cited

PUBLICATIONS

Chen et al, "Electrodeposited nanoporous ZnO films exhibiting enhanced performance in dye-sensitized solar cells," 2006, Electrochemica Acta vol. 51, pp. 5870-5875.*

Li et al, "Selected-Control Synthesis of ZnO Nanowries and Nanorods via a PEG-Assisted Route," 2003, Inorganic Chem. vol. 42, pp. 8105-8109.*

Feng et al, "Studies on the PEG-Assisted Hydrothermal Synthesis and Growth Mechanism of ZnO Microrod and Mesoporous Microsphere Arrays on the Substrate," 2010, Crystal Growth & Design vol. 10, pp. 1500-1507.*

Biswas et al, "Growth Kinetics of ZnO Nanorods: Capping-Dependent Mechanism and Other Interesting Features," 2008 J. Phys. Chem. C, 112, pp. 2404-2411.*

Wei et al, "Controlling Growth of ZnO rods by polyvinylpyrrolidone (PVP) and their optical properties," Mar. 17, 2009, Applied Surface Science 2552, pp. 6978-6984.*

Tong, Y. et la., "Growth and Optical Properties of Faceted Hexagonal ZnO Nanotubes," J. Phys. Chem. B, vol. 110, pp. 14714-14718, 2006.

Law, M. et al., "Nanowire Dye-Sensitized Solar Cells," Nature Materials, vol. 4, pp. 455-459, 2005.

Greene, L. et al., "General Route to Vertical ZnO Nanowire Arrays Using Textured ZnO Seeds," Nano Letters, vol. 5, pp. 1231-1236, 2005.

Panigrahy, Bharati et al., "Polymer-mediated shape-selective synthesis of ZnO nanostructures using a single-step aqueous approach," CrystEngComm, vol. 11, pp. 1920-1925.

Duan et al. "PEG-assisted synthesis of ZnO nanotubes." Materials Letters 60 (2006) 1918-1921.

Govender et al. "Understanding the factors that govern the deposition and morphology of thin films of ZnO from aqueous solution." Journal of Materials Chemistry 14 (2004) 2575-2591.

He et al. "Vertically well-aligned ZnO nanowires generated with self-assembling polymers." Materials Chemistry and Physics 94 (2005) 29-33.

Hong et al. "In Situ Growth of ZnO Nanocrystals from Solid Electrospun Nanofiber Matrixes." Langmuir 22 (2006) 7331-7334.

Hsi et al. "Directed Spatial Organization of Zinc Oxide Nanorods." Nano Letters 5 (2005) 83-86.

Th. Pauporté "Highly Transparent ZnO/Polyvinyl Alcohol Hybrid Films with Controlled Crystallographic Orientation Growth." Crystal Growth & Design 7 (2007) 2310-2315.

Sui et al. "White-light emission of polyvinyl alcohol/ZnO hybrid nanofibers prepared by electrospinning." Applied Physics Letters 87 (2005) 113115.

Yang et al. "Preparation and characterization of ZnO nanofibers by using electrospun PVA/zinc acetate composite fiber as precursor." Inorganic Chemistry Communications 7 (2004) 176-178.

Inamdarm, A I, et al., "Surfactant-mediated growth of nanostructured zinc oxide thin films via electrodeposition and their photoelectrochemical performance," Nanotechnology, vol. 19 No. 32, Jul. 2008, 325706, pp. 1-7.

Kumar, D., et al., "Synthesis of ZnO:Mn Nanoparticles, Nanobelts and Nanorods," Journal of Ovonic Research, Oct. 2008, vol. 4, No. 5, pp. 101-105.

Liu, X.M. and Zhou, Y.C., "Seed-mediatedsynthesis of uniformZnOnanorods in the presence of polyethyleneglycol," Journal of Crystal Growth, Oct. 1, 2004, vol. 270, No. 3-4, pp. 527-534.

Yiamsawas, D., et al., "Synthesis and characterization of ZnO nanostructures with antimicrobial properties," International Conference on Nanoscience and Nanotechnology, Feb. 25-29, 2008, pp. 133-136.

* cited by examiner

POLYMER-MEDIATED SYNTHESIS OF ZNO NANOSTRUCTURES

BACKGROUND

1. Field of the Invention

The present disclosure relates to methods for the synthesis of zinc oxide (ZnO) nanostructures, such as nanorods, nanoneedles, and nanowires.

2. Description of the Related Art

Semiconductor nanostructures have attracted significant interest due to their novel physical and chemical properties, which depend on their size, shape and morphology. Lately, attention has been focused on the materials chemistry of one-dimensional (1D) semiconductor oxides. The wide band gap (around 3.37 eV) and large excitonic binding energy (about 60 meV) make ZnO a good candidate for a variety of applications, such as room temperature UV lasers, light-emitting diodes, solar cells, sensors, thin-film transistor, and varistors. Also the optical and electronic properties of ZnO can be simultaneously controlled by varying the shape, dimension and uniformity of the nanostructures.

Several methods, for example, molecular beam epitaxy, thermal evaporation, vapor-liquid-solid growth, laser-ablation methods, chemical vapor deposition, metal organic chemical vapor deposition, hydrothermal methods, solvothermal methods, and electrochemical deposition have been developed to prepare ZnO nanostructures. Certain techniques typically require high pressure and longer reaction times (e.g., several days). Other methods require complex procedures, high costs, sophisticated instrumentation and rigid conditions.

SUMMARY

The methods of the example embodiments are simple, rapid, low-cost, and environmentally benign.

Thus, in one aspect the example embodiments provide methods for producing a ZnO nanostructure, the methods comprising heating an aqueous solution comprising (1) a zinc compound, (2) a base, and (3) a polymer.

Another aspect of the example embodiments provides particular ZnO nanostructures. The ZnO nanostructures can be prepared by the method of the present application.

In another example aspect, a method for producing a ZnO nanostructure, the method comprising heating an aqueous solution comprising (1) a zinc compound, (2) a base, and (3) polyvinylpyrrolidinone (PVP) or poly(ethylene glycol) (PEG), to a temperature of greater than about 80 and less than 100° C. In an example embodiment, the zinc compound is selected from the group consisting of: zinc chloride, zinc nitrate, zinc acetate, and mixtures thereof. In another example, the base is hexamethylenetetramine (HMTA), ethylenediaminetetraacetic acid (EDTA), $NH_3$, ($C_1$-$C_6$ alkyl)amine, di($C_1$-$C_6$ alkyl)amine, tri($C_1$-$C_6$ alkyl)amine, LiOH, NaOH, KOH, or $Ca(OH)_2$. In yet another example aspect, the base is HMTA, $NH_3$, or NaOH.

According to another example, the aqueous solution is heated to a temperature of at least 85° C. In another example, the aqueous solution is heated for at least 80 minutes. In yet another example, the aqueous solution is heated for about 50 minutes.

In another example embodiment, the ratio of the zinc compound to the base is 1:1 to 2:1. In another example embodiment, the ratio of zinc chloride to HMTA is 1:1. In another example embodiment, the aqueous solution is about 2 to about 20 wt % of PVP. In yet another example embodiment, the aqueous solution is about 5 wt % of PEG. In another example embodiment, the aqueous solution is about 10 wt % of PEG.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWING(S)

FIGS. 1 (a)-(d) show SEM images of ZnO nanostructures that are products of Example 3.

FIG. 2 shows SEM images of hexagonal ZnO nanostructures prepared in presence of different wt % of PVP: (a) top view, and (b) magnified SEM images for 2 wt % PVP; (c) top view, and (d) magnified SEM images for 5 wt % PVP; (e) top view, and (f) magnified SEM images for 10 wt % PVP; and (g) top view, and (h) magnified SEM images for 20 wt % PVP.

DETAILED DESCRIPTION

Figure 1:
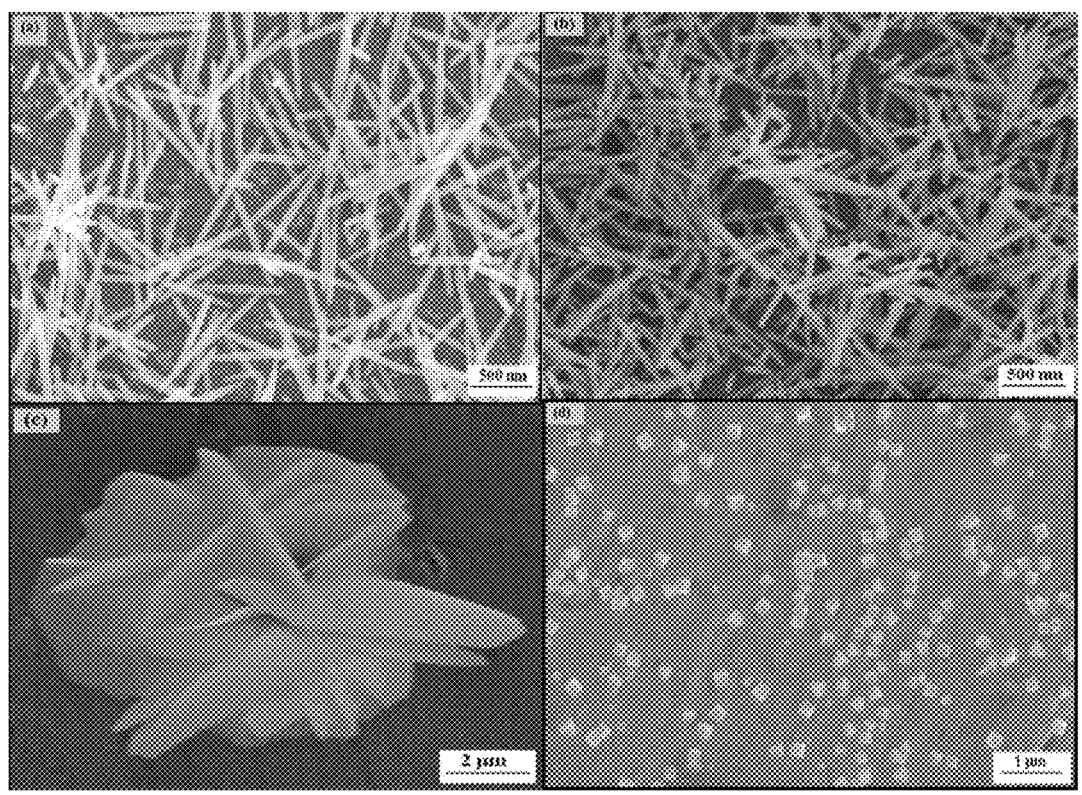

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and are made part of this disclosure.

As used herein with respect to the example embodiments, an "aspect ratio" is a ratio of length of the nanostructure to diameter. Of course, other embodiments are possible within the scope of the present application.

With respect to the particular example embodiments, a "nanoneedle" is a solid, generally rod-shaped structure having at least one end that tapers to a point, a length in the micrometer range, for example up to about 100 μm (i.e., in its longest direction), and an aspect ratio of less than 50. Further, the term nanoneedle as used herein means a rod having any cross-sectional shape, such as, for example, round, triangular, square, pentagonal, hexagonal, heptagonal, etc. Particular nanoneedles are those having a substantially hexagonal cross-section.

With respect to the particular example embodiments, a "nanorod" is generally a solid structure with blunt ends, length in the micrometer range, for example up to about 100 μm (i.e., in its longest direction) with diameter >70-80 nm, and an aspect ratio of less than 50. Further, the term nanonrod as used herein means a rod having any cross-sectional shape, such as, for example, round, triangular, square, pentagonal, hexagonal, heptagonal, etc. Particular nanorods are those having a substantially hexagonal cross-section.

In the particular example embodiments, a "nanowire" is a generally elongated structure having virtually any cross-sectional shape, and can be, for example, substantially solid, or hollow (i.e., a "nanotube"). A length of the nanowire can be in the micrometer range, for example up to about 100 µm (i.e., in its longest direction) and diameter 70-80 nm, with an aspect ratio of more than 50.

In the particular example embodiments, a "nanodisc" or "disc" is a generally flat structure having virtually any cross-sectional shape and an aspect ratio of less than 1.

The methods for producing a ZnO nanostructures, generally involve heating an aqueous solution of a zinc compound, a base, and a polymer which is either polyvinylpyrrolidinone (PVP) or poly(ethylene glycol) (PEG).

In one example embodiment, the disclosure provides a method for producing a ZnO nanostructures, the method comprising (a) forming an aqueous solution comprising (1) a zinc compound, (2) a base, and (3) polyvinylpyrrolidinone (PVP) or poly(ethylene glycol) (PEG); and (b) heating the aqueous solution. In an example embodiment, the aqueous solution is heated to a temperature of greater than about 80 and less than 100° C.

In another example embodiment, the disclosure provides a method for producing a ZnO nanostructures, the method comprising (a) forming an aqueous solution comprising (1) a zinc compound, (2) a base, and (3) polyvinylpyrrolidinone (PVP) or poly(ethylene glycol) (PEG); (b) adding a substrate to the aqueous solution; and (c) heating the aqueous solution. In an example embodiment, the aqueous solution is heated to a temperature of greater than about 80 and less than 100° C.

In one example embodiment, the disclosure provides a method for producing a ZnO nanostructures, the method comprising (a) forming an aqueous solution comprising (1) a zinc compound, (2) a base, and/or (3) polyvinylpyrrolidinone (PVP) or poly(ethylene glycol) (PEG); and (b) heating the aqueous solution. In an example embodiment, the aqueous solution is heated to a temperature of greater than about 80 and less than 100° C.

In another example embodiment, the disclosure provides a method for producing a ZnO nanostructures, the method comprising (a) forming an aqueous solution comprising (1) a zinc compound, (2) a base, and/or (3) polyvinylpyrrolidinone (PVP) or poly(ethylene glycol) (PEG); (b) adding a substrate to the aqueous solution; and (c) heating the aqueous solution. In an example embodiment, the aqueous solution is heated to a temperature of greater than about 80 and less than 100° C.

In particular example embodiments of the methods as described herein, the nanostructures are nanorods, nanoneedles, or nanowires.

In another embodiment of the methods described above, the nanostructures produced by the methods are nanorods. In still another embodiment of the described method, the nanostructures produced are nanoneedles. In yet another embodiment, the nanostructures produced are nanowires.

In other particular embodiments, the nanostructures produced by the disclosed methods are nanorods having a generally or substantially hexagonal cross-sectional shape.

In example embodiments of the methods of the present application, the zinc compound is selected from the group consisting of: zinc chloride, zinc nitrate, zinc acetate, and mixtures thereof.

In another embodiment of the methods of the present application, the zinc compound is zinc chloride.

Various bases can be used in the methods of the application; examples of suitable bases are hexamethylenetetramine (HMTA), ethylenediaminetetraacetic acid (EDTA), $NH_3$, ($C_1$-$C_6$ alkyl)amine, di($C_1$-$C_6$ alkyl)amine, tri($C_1$-$C_6$ alkyl)amine, LiOH, NaOH, KOH, or $Ca(OH)_2$.

In another embodiment of the methods of the application, the base is HMTA, $NH_3$, or NaOH.

In yet another embodiment of the methods of the application, the base is HMTA.

In particular embodiments of the methods as described herein, the aqueous solution is heated at ambient pressure.

In another embodiment, the disclosure provides a method as described herein, wherein the aqueous solution is heated to a temperature of at least 85° C.

In another embodiment of the methods as described herein, the aqueous solution is heated for at least 80 minutes. In an example embodiment, heating the aqueous solution for at least 80 minutes obtains nanorods.

In one embodiment of the methods as described herein, the aqueous solution is heated for at least about 4 hours to obtain nanostructures having length of about 5 to 6 µm and diameter of about 250 nm.

In another embodiment of the methods as described herein, the aqueous solution is heated for at least about 8 hours to obtain nanostructures having length of about 20 to 22 µm and diameter of about 550 nm.

In yet another embodiment of the methods as described herein, the aqueous solution is heated for up to 50 minutes. In an example embodiment, heating the aqueous solution for up to 50 minutes obtains nanoneedles.

In particular embodiments of the methods as described herein, the zinc compound and the base are dissolved separately, and the zinc compound solution and the base solution are subsequently mixed. In certain embodiments, to the mixture of zinc compound and the base, a solution of polymer is added.

In another embodiment of the methods of the present application, the zinc compound solution has concentration of between 0.001 M and 1.0 M. Other zinc compound solution has concentration of about 0.01 M to 0.1 M. In still other embodiments, the concentration of the zinc compound solution is 0.01 M.

In yet another embodiment of the methods of the present application, the base solution has concentration of between 0.001 M and 0.1 M. Other base solution has concentration of about 0.01 M to 0.05 M. In still other embodiments, the concentration of the base solution is 0.01 M.

In one embodiment, the disclosure provides a method as described herein, wherein the ratio of the zinc compound to the base is 1:1 to 2:1.

In another embodiment of the method as described herein, the ratio of zinc chloride to HMTA is 1:1.

The growth of different shapes mainly depends on the type and concentration of the precursors, growth temperature, addition of the polymer, and pre-treatment of the substrate. The variation of the molar concentration of the zinc compound and the base renders needle-like, flower-like, and square-disc-like morphology. First, ZnO nuclei tend to grow along the c-axis, i.e. [0001] direction to form a needle-like structure. Then as the crystal growth along the [0001] direction decreases, nanodisks are formed. When the crystal growth along the c-axis is suppressed and nuclei start agglomerating; and a flower-like structure is obtained. It has been discovered that the addition of the particular polymers disclosed herein to an aqueous solution of zinc compound influences the shape, and hence the magnetic and optical properties of the ZnO nanostructures. Without being limited to any particular theory, the polymer controls the nucleation and growth along a specific direction by adjusting the rate of growth among the ZnO nuclei, resulting in hexagonal nanorods and thin nanowires. For example, the addition of PVP results in well-faceted hexagonal disc and nanorod morphology; the addiction of PEG results in thin long round-shape highly dense nanowires.

In one embodiment, the disclosure provides a method as described herein, wherein the aqueous solution comprises about 2 to about 20 wt % of PVP (with respect to the total weight of zinc chloride).

Polyvinylpyrrolidinones selected from a wide range of molecular weights may be used in the methods of the example embodiments. Particular PVPs useful in the example embodiments are those having molecular weights of from about 5,000 to 55,000 g/mol. Other particular PVPs have molecular weights from about 20,000 to 50,000 g/mol. In still other embodiments, the molecular weight of the PVP is about 40,000 g/mol. Mixtures of PVPs with different molecular weights can also be used.

Unless otherwise defined, polymers molecular weights noted herein are weight-averaged molecular weights ($M_W$).

In another embodiment, the disclosure provides a method as described herein, wherein the aqueous solution comprises about 5 wt % of PEG (with respect to the total weight of zinc chloride).

Poly(ethylene glycols) and end-capped poly(ethylene glycols) selected from a wide range of molecular weights may be used in the methods of the present application. Particular PEGs useful in the present embodiments are those having molecular weights of from about 1,000 to 50,000 g/mol. Other particular PEGs have molecular weights from about 2,000 to 20,000 g/mol. In still other embodiments, the molecular weight of the PEG is about 5,000 g/mol. Mixtures of PEGs with different molecular weights can also be used.

Various substrates may be employed. Examples of suitable substrates include single crystals and thin films (Si, Ge, GaAs, InP, SiC, diamond), polycrystalline substrates (e.g., polycrystalline Si), amorphous Si, and Si compound materials. Other examples include substrates having a conductive surface including ITO (indium-tin-oxide), FTO (fluorine-doped tin oxide), a noble metal, Mn, Fe, Co, Ni, Cu, or carbon. In one embodiment, the disclosure provides a method wherein a substrate added to the aqueous solution is selected from: copper, glass, silicon, silicon oxide, aluminum oxide, and gallium nitride. In a particular example embodiment, the substrate is copper, silicon, silicon oxide, and gold coated silicon oxide. In another example embodiment, the substrate is copper.

The example embodiments also provide ZnO nanostructures, and particularly nanostructures prepared by the methods described herein.

In one embodiment of the disclosure, the nanostructure is a produced using polyvinylpyrrolidinone (PVP). In another embodiment, the nanostructure is a produced using poly(ethylene glycol) (PEG).

In one embodiment of the disclosure, the nanostructure is a nanorod having a hexagonal cross-sectional shape and a diameter of about 200 nm to about 1000 nm.

In one embodiment, the disclosure provides a nanorod having length to diameter ratio (aspect ratio) of 50:1 to 1:1. In another embodiment, the disclosure provides a nanorod having aspect ratio of 20:1 to 1:1. In yet another embodiment, the disclosure provides a nanorod having aspect ratio of 10:1 to 1:1.

In another example embodiment, nanorods having an aspect ratio of 10:1 can be prepared by the method as described herein where the concentration of PVP is 2 wt % (with respect to the total weight of zinc chloride). In another embodiment, the nanorod with the aspect ratio of 1:1 is prepared by the method as described herein when the concentration of PVP is 20 wt % (with respect to the total weight of zinc chloride).

In yet another embodiment of the disclosure, the nanostructure is a nanowire having a diameter of about 50 to 100 nm. In yet another embodiment, the nanostructure is a nanowire having a diameter of about 70 to 80 nm.

In another embodiment, the disclosure provides a nanowire having a diameter of about 70 to 80 nm and an aspect ratio of 65:1 to 70:1. In another embodiment, the nanowire with the aspect ratio of 65:1 to 70:1 is prepared by the method as described herein when the polymer is PEG.

In another embodiment, the nanostructure is a nanoneedle having length of about 2 to 3 µm. In another embodiment, the nanoneedle having length of about 2 to 3 µm is prepared by the method as described herein when the reaction time is up to 50 minutes.

The ZnO nanostructures prepared by the method of the disclosure can be used in a variety of applications, such as room temperature UV lasers, light-emitting diodes, solar cells, sensors, thin-film transistor, and varistors.

EXAMPLES

General Procedure

In the examples, chemicals were analytical grade reagents and used as reactants without further purification. Reaction solutions are prepared by mixing specific amounts of precursors with milliQ (18.2 MΩ·cm) water in separate containers. Precursors are completely dissolved in water and then two solutions are mixed in a beaker. Before precipitation began, a cleaned copper substrate is vertically lowered into the reaction solution and the solution contained in a beaker is then placed inside a heating oven. Then the deposited substrate is removed from the solution, copiously rinsed with milliQ water and dried at room temperature. For cleaning purposes, the substrate is rinsed ultrasonically sequentially for 10 minutes with each of acetone and milliQ water before deposition.

The identification and purity of the phase are confirmed by X-ray diffraction (XRD) using Philips powder diffractometer PW3040/60 with Cu Kα radiation (λ=1.54 Å). The morphology and composition of the samples were examined by Hitachi S-3400N Scanning Electron Microscope (SEM) and energy dispersive X-ray spectroscopy (EDX). Photoluminescence (PL) spectra were measured at room temperature following the excitation with a continuous wave He—Cd laser (λ=325 nm). The magnetic properties of the sample were measured by a physical property measurement system (Quantum Design PPMS).

Example 1

Effect of PVP Addition

An aqueous zinc chloride solution (0.01 M) was mixed with an aqueous HMTA (0.01 M) solution in a molar ratio of 1:1. To this mixture, PVP ($M_W$=40,000) was added in a 2 wt % (with respect to the total weight of zinc chloride) concentration. Before precipitation began, a cleaned copper substrate is vertically lowered into the reaction solution and the solution contained in a beaker is then placed inside a heating oven at 85-90° C. for 80 min. Then the deposited substrate is removed from the solution, copiously rinsed with milliQ water and dried at room temperature. For cleaning purposes, the substrate is rinsed ultrasonically sequentially for 10 minutes with each of acetone and milliQ water before deposition.

The same reaction was repeated with varying concentrations of PVP: the reaction was repeated with 5, 10, and 20 wt % of PVP.

Figure 2:
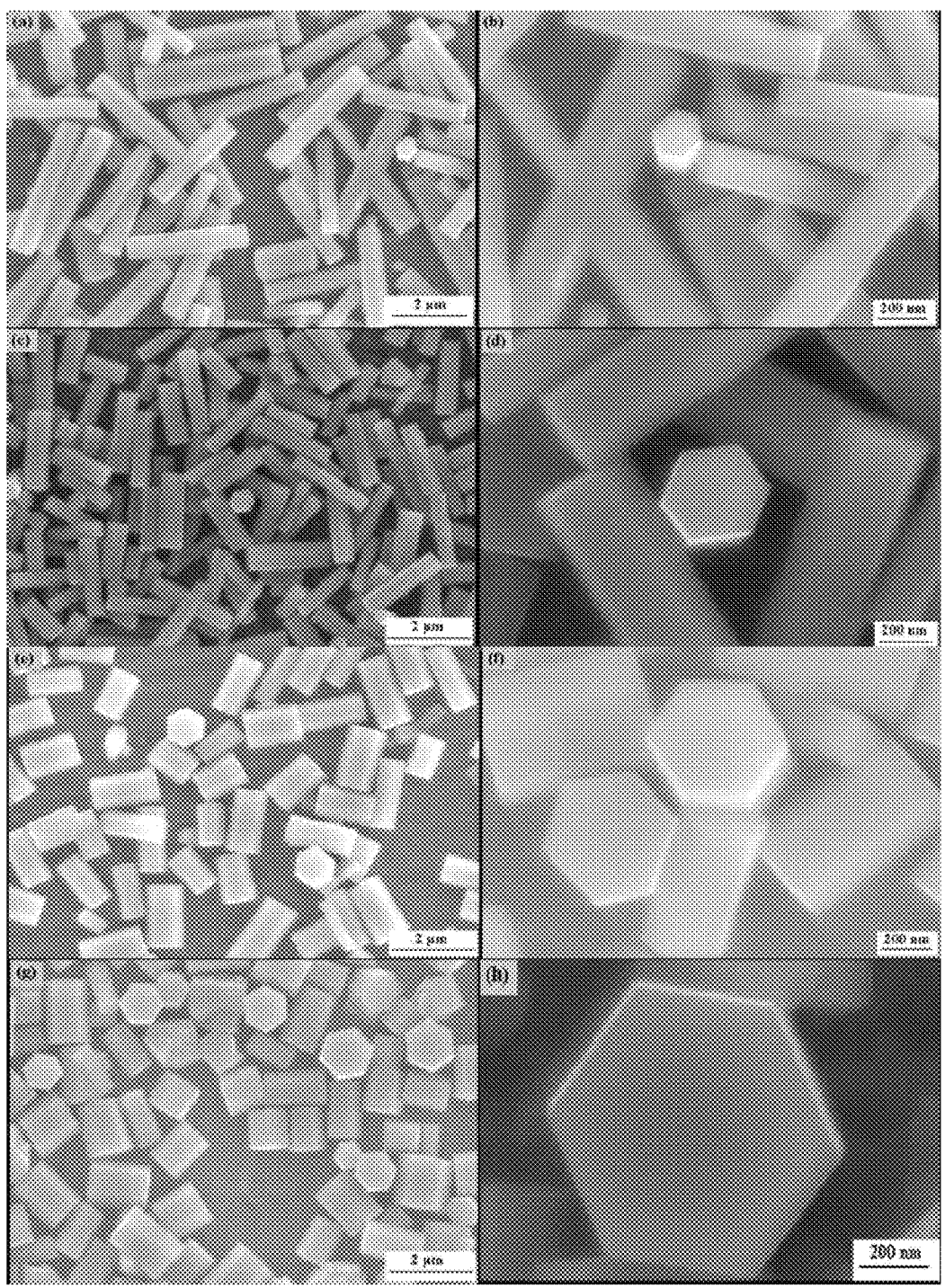
Figure 3:
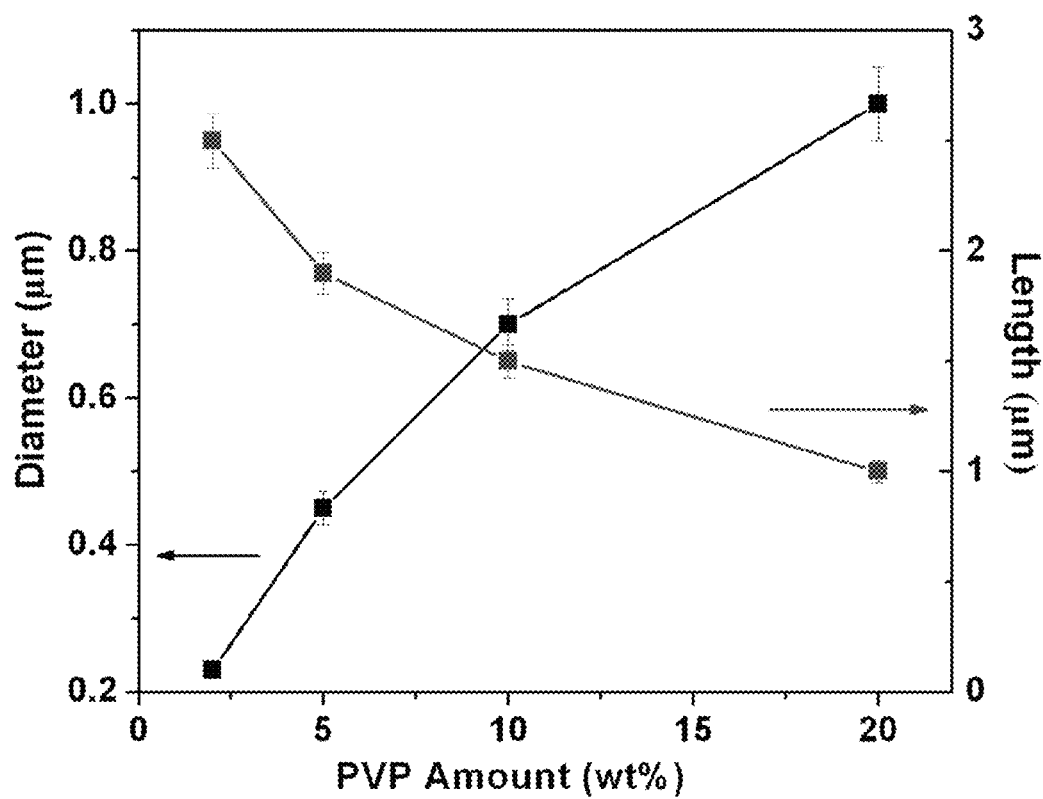
FIG. 3 shows an example growth diagram of ZnO hexagonal nanostructures as a function of PVP concentration (Error bar about 5%).

FIG. 2 shows the effect of increasing the PVP concentration on the diameter of the nanorods: As the concentration of PVP was increased, the nanorod diameter increased from 200 nm to 1 µm, and the aspect ratio decreased from 10:1 to 1:1. The hexagonal cross-shape remained unchanged. FIG. 3 shows the effect of PVP concentration on ZnO nanostructure diameter and length.

The single-phase wurtzite structure of these ZnO nanostructures was confirmed by XRD. Wurtzite is the most stable phase of ZnO. An added advantage of this structure is that it is an open structure with polarization properties.

Example 2

Effect of PEG Addition

An aqueous zinc chloride solution (0.01 M) was mixed with an aqueous HMTA (0.01 M) solution in a molar ratio of 1:1. To this mixture, PEG (5,000 $M_W$) was added in a 5 wt % (with respect to the total weight of zinc chloride) concentration. Before precipitation began, a cleaned copper substrate is vertically lowered into the reaction solution and the solution contained in a beaker is then placed inside a heating oven at 85-90° C. for 80 min. Then the deposited substrate is removed from the solution, copiously rinsed with milliQ water and dried at room temperature. For cleaning purposes, the substrate is rinsed ultrasonically sequentially for 10 minutes with each of acetone and milliQ water before deposition.

Figure 4:
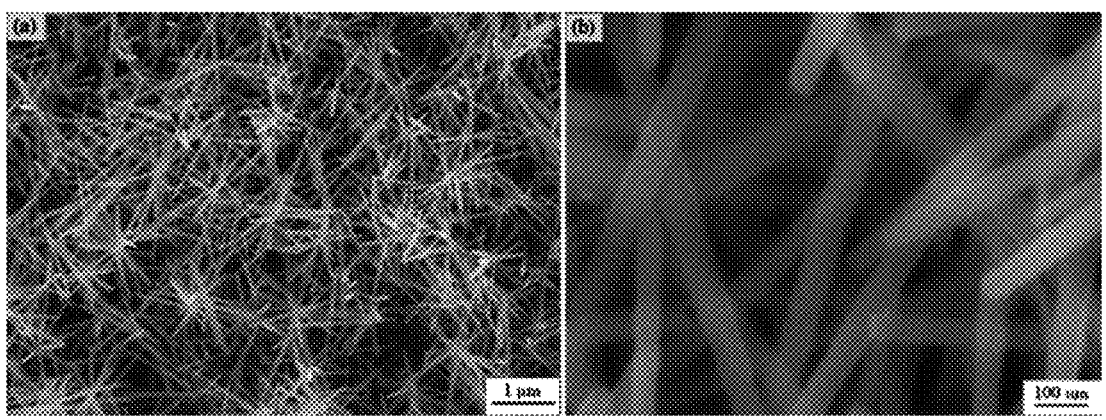
FIG. 4 shows SEM images of ZnO nanostructures prepared in presence of PEG: (a) low, and (b) high resolution of SEM image.

SEM (FIG. 4) shows ZnO nanowires produced by this procedure and having a length of around 5 µm, a diameter of about 70-80 nm, and an aspect ratio of 65:1 to 70:1.

Example 3a

Nanoneedles

The nanoneedles shown in FIG. 1(a) are prepared in the absence of a polymer solution and according to the general procedure using zinc chloride and HMTA: An aqueous zinc chloride solution (0.01 M) was mixed with an aqueous HMTA solution (0.01 M) in a molar ratio of 1:1. Before precipitation began, a cleaned copper substrate is vertically lowered into the reaction solution and the solution contained in a beaker is then placed inside a heating oven at 85-90° C. for 50 min. Then the deposited substrate is removed from the solution, copiously rinsed with milliQ water and dried at room temperature. For cleaning purposes, the substrate is rinsed ultrasonically sequentially for 10 minutes with each of acetone and milliQ water before deposition.

Example 3b

Nanorods

The nanorods shown in FIG. 1(b) are prepared in the absence of a polymer solution and according to the general procedure using zinc chloride and HMTA as described in Example 3a, wherein the reaction time is increased to 80 min in a heating oven at 85-90° C.

Example 3c

Flower-Shaped Nanostructures

The flower-like structures FIG. 1(c) are prepared in the absence of a polymer solution and according to the general procedure using zinc chloride and HMTA: An aqueous zinc chloride solution (0.1 M) was mixed with an aqueous HMTA solution (0.1 M) in a molar ratio of 1:1. Before precipitation began, a cleaned copper substrate is vertically lowered into the reaction solution and the solution contained in a beaker is then placed inside a heating oven at 85-90° C. for 80 min. Then the deposited substrate is removed from the solution, copiously rinsed with milliQ water and dried at room temperature. For cleaning purpose, the substrate is rinsed ultrasonically sequentially for 10 minutes with each of acetone and milliQ water before deposition.

Example 3d

Nanosquare Disks

The nanosquare discs shown in FIG. 1(d) are prepared in the absence of a polymer solution and according to the general procedure using zinc chloride and HMTA: An aqueous zinc chloride solution (0.1 M) was mixed with an aqueous HMTA solution (0.05 M) in a molar ratio of 2:1. Before precipitation began, a cleaned copper substrate is vertically lowered into the reaction solution and the solution contained in a beaker is then placed inside a heating oven at 85-90° C. for 80 min. Then the deposited substrate is removed from the solution, copiously rinsed with milliQ water and dried at room temperature. For cleaning purpose, the substrate is rinsed ultrasonically sequentially for 10 minutes with each of acetone and milliQ water before deposition.

X-ray diffraction studies of the nanostructures produced in Examples 1-3 reveal that the products exhibit a single-phase wurtzite structure of ZnO. Energy dispersive X-ray spectroscopy (EDX) confirms the presence of only zinc and one oxygen in the required ratio (i.e., Zn:O is 1:1).

Figure 5:
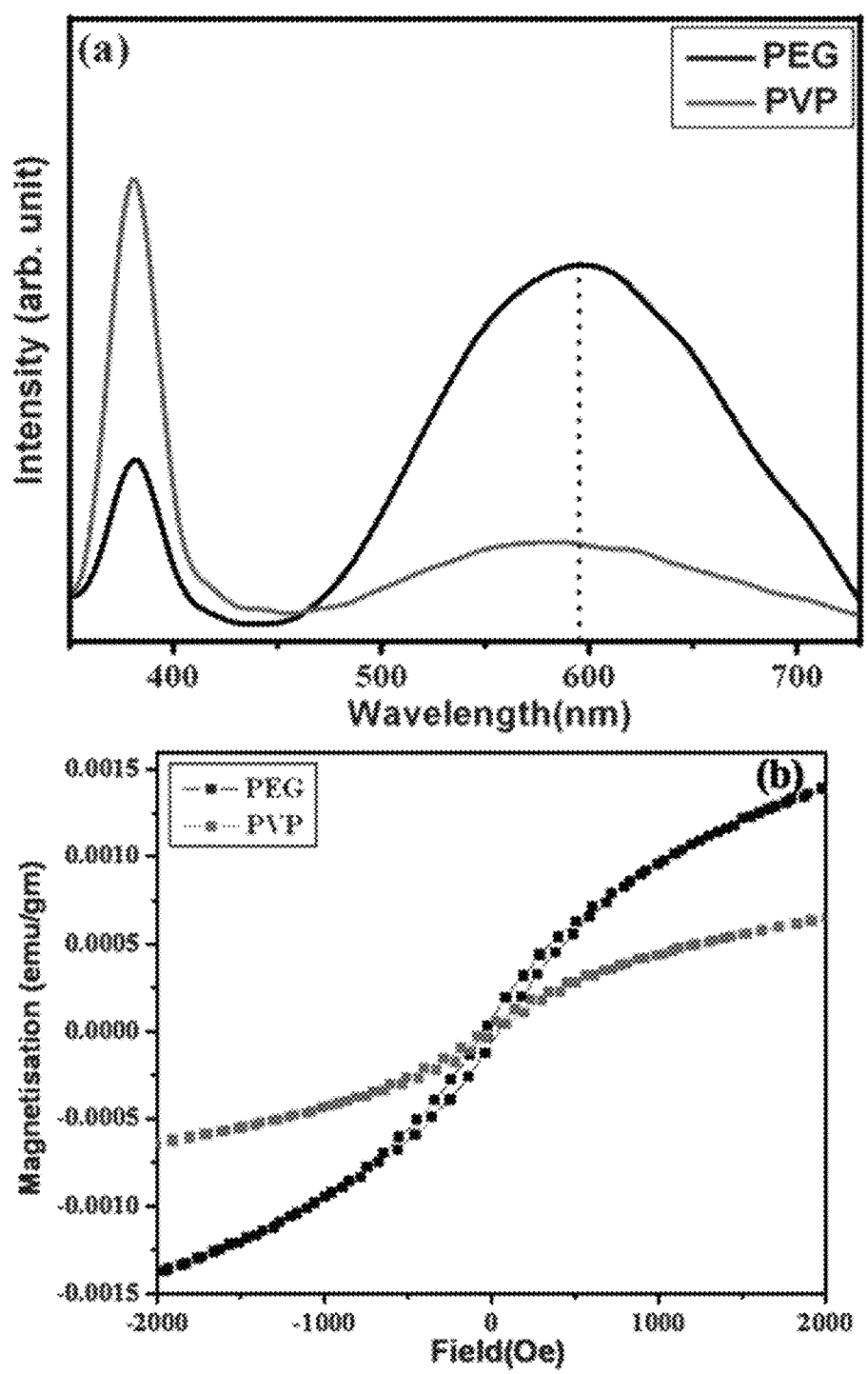
FIG. 5 shows (a) Photoluminescence (PL) spectra and (b) hysteresis (M-H) loop of hexagonal ZnO nanostructures by addition of PVP and ZnO nanostructures by addition of PEG at room temperature.

Room temperature photoluminescence (PL) spectra of the ZnO nanostructures produced in Examples 1 and 2 are shown in FIG. 5(a). Strong emissions with maxima centered at about 590 and 595 nm were observed for the ZnO nanostructures produced under PVP conditions (nanorods) and PEG conditions (nanowires), respectively. FIG. 5(a) shows that the nanostructures produced under PEG conditions have a more intense yellow-orange emission than the hexagonal nanostructures produced under PVP conditions, which is due to a higher surface-to-volume ratio for the nanowires than the hexagonal nanorods.

Thin films and nanocrystals of ZnO have been reported to exhibit ferromagnetism at room temperature in the absence of any doping, and may be related to the defects or vacancies present in the sample. A preliminary magnetization versus field measurement of as-synthesized hexagonal ZnO nanorods and nanowires exhibited a ferromagnetic-like ordering at room temperature. FIG. 5b shows a typical example of the hysteresis (M-H) loop of hexagonal ZnO nanorods produced by Examples 1 and 2. The estimated coercive field $H_C$ for the ZnO nanorods and nanowires is 30 and 45 Oe, respectively.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for producing a ZnO nanostructure wherein the ZnO nanostructure has a single-phase wurtzite structure, the method comprising:
   receiving aqueous zinc chloride in a solution;
   receiving aqueous hexamethylenetetramine (HMTA) in the solution;
   receiving polyvinylpyrrolidinone (PVP) in the solution, wherein the solution comprises about 2 wt % to about 20 wt % of PVP;
   receiving a copper substrate in the solution; and
   heating the solution to a temperature of greater than about 80° C. and less than 100° C. to form the single-phase wurtzite ZnO nanostructure deposited on the substrate.

2. The method of claim 1, wherein the ZnO nanostructure of the particular shape has room temperature photoluminescence.

3. The method of claim 2, wherein the photoluminescence has a maximum centered at about 590 nm.

4. The method of claim 1, wherein the heating is performed at ambient pressure.

5. The method of claim 1, wherein the heating includes heating to a temperature of at least 85° C. and less than 100° C.

6. The method of claim 1, wherein the heating includes heating for at least 80 minutes.

7. The method of claim 1, wherein the heating includes heating for about 50 minutes.

8. The method of claim 1, wherein the ratio of the zinc chloride to the HMTA is 1:1 to 2:1.

9. The method of claim 1, wherein the ratio of the zinc chloride to the HMTA is 1:1.

10. The method of claim 1, wherein the solution is prepared by mixing the aqueous solution of zinc chloride with aqueous HMTA, followed by addition of PVP.

11. The method of claim 10, wherein the solution of zinc chloride has a concentration of about 0.01 M to 0.1 M.

12. A method for producing ZnO nanorods, the method comprising:
- receiving aqueous zinc chloride in a solution;
- receiving aqueous hexamethylenetetramine (HMTA) in the solution, wherein the molar ratio of the zinc chloride to the HMTA is 1:1;
- receiving polyvinylpyrrolidinone (PVP) in the solution, wherein the solution comprises about 20 wt % of PVP;
- receiving a copper substrate in the solution;
- heating the solution to a temperature of 85° C.-100° C.;
- removing the substrate from the solution; and
- drying the substrate to form the ZnO nanorods.

13. A method for producing a ZnO nanostructure wherein the ZnO nanostructure is a nanorod with an aspect ratio of 10:1, the method comprising:
- receiving aqueous zinc chloride in a solution;
- receiving aqueous hexamethylenetetramine (HMTA) in the solution, wherein the molar ratio of the zinc chloride to the HMTA is 1:1;
- receiving polyvinylpyrrolidinone (PVP) in the solution, wherein the solution comprises about 2 wt % of PVP;
- receiving a copper substrate in the solution; and
- heating the solution to a temperature of greater than about 80° C. and less than 100° C. to form the ZnO nanorod with an aspect ratio of 10:1.

* * * * *

UNITED STATES PATENT AND TRADEMARK OFFICE
CERTIFICATE OF CORRECTION

PATENT NO. : 8,992,883 B2  
APPLICATION NO. : 12/794272  
DATED : March 31, 2015  
INVENTOR(S) : Panigrahy et al.

Page 1 of 1

It is certified that error appears in the above-identified patent and that said Letters Patent is hereby corrected as shown below:

Title Page 2, in Item (56), under "PUBLICATIONS", in Column 1, Line 4, delete "Nanowries" and insert -- Nanowires --, therefor.

In the Claims

In Column 10, Line 48, in Claim 2, delete "of the particular shape".

Signed and Sealed this  
Twenty-second Day of September, 2015

Michelle K. Lee  
*Director of the United States Patent and Trademark Office*